(No Model.)

W. P. BUTLER.
TYPE WRITER ATTACHMENT.

No. 576,948. Patented Feb. 9, 1897.

Witnesses.
S. W. Devore
N. A. Sprong

Inventor.
Walter P. Butler.

UNITED STATES PATENT OFFICE.

WALTER P. BUTLER, OF MINNEAPOLIS, MINNESOTA.

TYPE-WRITER ATTACHMENT.

SPECIFICATION forming part of Letters Patent No. 576,948, dated February 9, 1897.

Application filed October 30, 1895. Serial No. 567,341. (No model.)

*To all whom it may concern:*

Be it known that I, WALTER P. BUTLER, of Minneapolis, in the county of Hennepin and State of Minnesota, have invented a new and improved Type-Writer Attachment, to be known as a "Tabulator," of which the following is a full, clear, and exact description.

The invention will be hereinafter fully described and finally embodied in the claims.
Reference is had to the accompanying drawings, representing the invention and forming part of this specification.

Figure 1 is a partial view of a "Smith Premier Type-Writer," showing my device attached thereto. In this case the digit-scale is shown at $b$ as forming a part of the center pointer $x$, which is a permanent feature of the machine. The adjustable pointer $a$ is attached to the rod $r$ by means of a collar $c$, fastened with a set-screw $y$. $e$ represents a part of the carriage.

Fig. 2 is a sectional view of Fig. 1, showing the relationship of the parts.

Fig. 3 shows another form (side view) of the attachment $c$ in Figs. 1 and 2. In this case, instead of having a collar and a set-screw, as in said figures, the attachment is in the form of a spring-clamp $c'$, and the same form is shown in the subsequent figures. This device renders the point $a$ more readily removable and adjustable.

Figure 6:
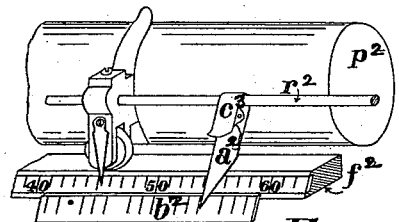
Fig. 6 is a partial view of the "Yost" type-writer, showing my device attached thereto, and in this figure $p^2$ indicates the platen, $f^2$ the scale-bar, $b^2$ the digit-scale, and $r^2$ a rod to which the pointer $a^2$ is attached by means of the clip $c^3$.
Figure 7:
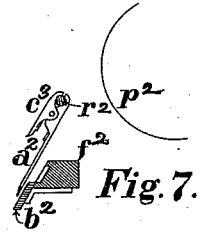
Figure 8:
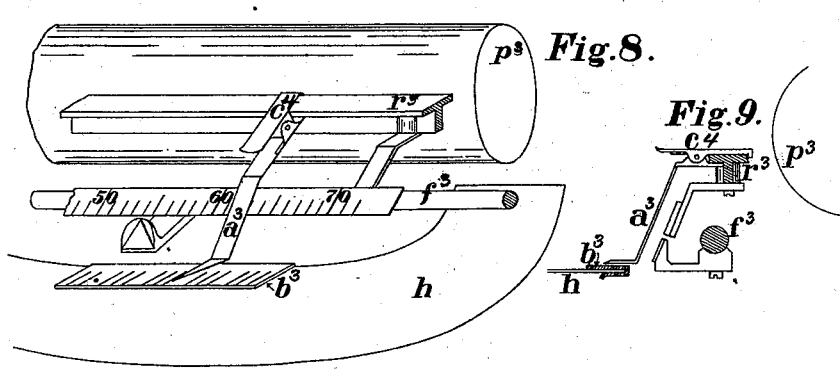

Fig. 7 is a sectional view of Fig. 6, showing the relationship of the parts.
Fig. 8 is a partial view of the "Remington" type-writer, showing my device attached thereto, the digit-scale $b^3$ being attached to the dust guard or plate $h$, covering the frame of the type-writer, and the pointer $a^3$ being attached to the rod $r^3$ on the carriage through the medium of the clip $c^4$, the rod $f^3$ carrying the usual scale of the type-writer. $p^3$ indicates the platen.

Figure 9:
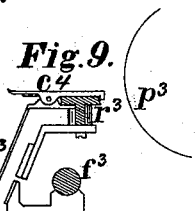

Fig. 9 is a sectional view of Fig. 8, showing the relationship of the parts in said figures.

Figure 1:
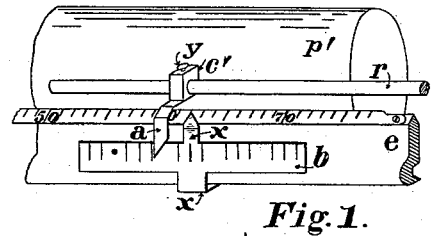
Figures 2, 3:
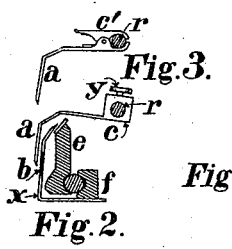
Figure 10:
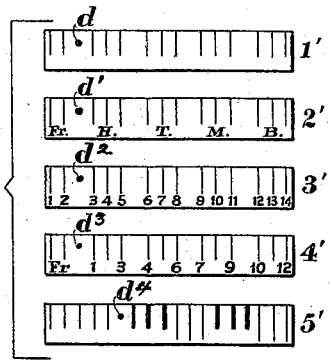
Figure 4:
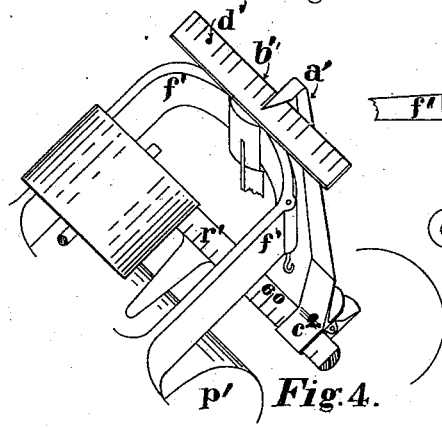
Fig. 4 is a partial view of the "Blickensderfer" type-writer, showing my device attached thereto, the digit-scale $b'$ being attached to the frame $f'$ of the type-writer and the pointer $a'$ being attached to the scale-rod $r'$. In this figure, $c^2$ indicates the clip for securing the pointer $a'$, and $p'$ indicates the platen.
Figure 5:
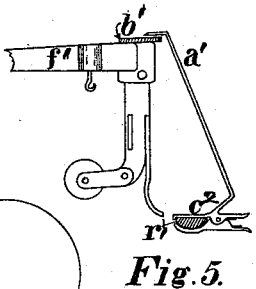
Fig. 5 is a sectional view of the form shown in Fig. 4, showing the relationship of the parts in said figure.

Fig. 10 shows five methods of graduating the digit-scale. $d\,d'\,d^2\,d^3\,d^4$ in each case shows the decimal point or line. $1'$ shows the several digital positions without any other designating-characters. $2'$ shows the fractional graduations as designated by the abbreviation "Fr" and the hundreds, thousands, millions, and billions groups of graduations as designated by the abbreviations "H T M B." $3'$ shows all the graduations to be designated by numbers. $4'$ shows the fractional graduations to be designated by the abbreviation "Fr" and the digital groups of graduations to be designated by figures.

In each of the four methods above described the digital groups of graduations are shown to be separated by a space, but at $5'$ the space is omitted and the groups of graduations are designated by the variation in their width and length, and a greater number of fractional graduations are added.

Figure 11:
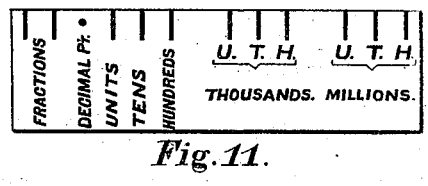

Fig. 11 shows (on an enlarged scale) in print the digital value or significance of each of the graduations of the scale.

Figure 12:
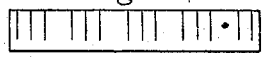

Fig. 12 shows a direct arrangement of the graduations. In the several plans shown in Fig. 10 the digital arrangement is seen to be reversed. This latter arrangement is necessary where the scale is attached to the frame of the machine and the pointer is attached to the carriage, as shown in Figs. 1 to 8. If, on the contrary, the scale is attached to the carriage and the pointer is attached to the frame of the machine, then the graduations on the scale must be direct or in their natural order, as shown at Fig. 12.

The great variety of type-writing machines and their diversity of form necessitates such a modification of form of the several parts of this device as will permit of their attachment or application to each machine. While thus varying in form the essential features of the device remain the same.

The digit-scale may be of any suitable material and it may vary in length according to the number of digital spaces required. It may be attached permanently to the machine, or it may be removable. It may be a separate feature of the machine or it may be incorporated into or made a part of some permanent feature of the machine, as shown at $x$, Fig. 1, where it is seen to be a part of the center pointer of the Smith Premier machine. The graduations may be reverse or direct, as respectively shown in Figs. 10, 11, and 12, and they may be designated in any one of many ways. The index-arm or pointer may be of metal or of other suitable material and of such form as to reach from its point of attachment on the carriage to the digit-scale, over the face of which the pointer must pass. It may be attached to any part of the carriage best suited to its attachment or adjustment, and by means of spring-clamps, collar, and set-screw, or other devices best suited to the purpose of said attachment or adjustment. It may be permanently attached by being incorporated with some other feature of the machine, or it may be removable, as shown in the several drawings herewith.

The operation or application of the device is as follows: The position of the decimal point, space, or line upon the paper being known, bring the carriage of the type-writer into position so that said decimal point, space, or line is in the center of the machine, or in the position of writing or impression. Then adjust the index-arm or pointer $a$ on the rod, scale-bar, or other part of the carriage to which it is attached in such position that its point points to the decimal-point on the digit-scale. The tabulator is now adjusted so that the operator by releasing the carriage may move it laterally to any digital position desired and indicated by the passage of the pointer over the digit-scale.

Figure 13:
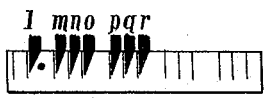

If it be desired to tabulate the following amounts, the carriage would be drawn into position so that the pointer would successively assume the positions on the scale shown in Fig. 13 ($l$, .10; $m$, 1.00; $n$, 10.00; $o$, 100.00; $p$, 1,000.00; $q$, 10,000.00; $r$, 100,000.00) by the letters $l$, $m$, $n$, $o$, $p$, $q$, and $r$. The eye of the operator follows the movement of the pointer and the hands record upon the keys the digits and spaces as indicated by the passage of the pointer over the scale. Thus there are saved all of the time and labor usually consumed in lifting the carriage and exposing the work in order to determine the proper lateral or digital adjustment.

The scale will ordinarily be constructed so as to allow for the leaving of a space after every third column of figures, thus:
100 000 000;
or for the insertion of a comma, thus:
100,000,000;
but if it is desired to write the figures without said intervening spaces or commas the scale can be graduated as shown at $5'$, Fig. 10.

Having thus described my invention and the principle of its operation, I claim as new and desire to secure Letters Patent on the following device:

1. An attachment for type-writers, consisting of a digital scale and a pointer, the scale and pointer being capable of connection one to the type-writer carriage and one to the type-writer frame and the pointer having a clamp by which it may be adjustably connected to the part which carries it, substantially as described.

2. An attachment for type-writers, consisting of a digital scale and a pointer, the scale and pointer being capable of connection one to the type-writer carriage and one to the type-writer frame and the pointer having a spring-clamp by which it may be removably and adjustably connected with the part which carries it, substantially as described.

3. The combination with a type-writer, of a digital scale secured to the type-writer frame and juxtaposed to the carriage and a pointer secured to the carriage and moving over the digital scale, the pointer having at one end a spring-clip by which it may be removably and adjustably held to the carriage, substantially as described.

WALTER P. BUTLER.

Witnesses:
S. W. DEVORE,
N. A. SPRONG.